US012437674B2

(12) United States Patent
Truppelli

(10) Patent No.: US 12,437,674 B2
(45) Date of Patent: Oct. 7, 2025

(54) LABELER FOR CYLINDRICAL OBJECTS

(71) Applicant: Gerald Scott Truppelli, Ringoes, NJ (US)

(72) Inventor: Gerald Scott Truppelli, Ringoes, NJ (US)

( * ) Notice: Subject to any disclaimer, the term of this patent is extended or adjusted under 35 U.S.C. 154(b) by 0 days.

(21) Appl. No.: 18/488,228

(22) Filed: Oct. 17, 2023

(65) Prior Publication Data

US 2025/0124822 A1 Apr. 17, 2025

(51) Int. Cl.
*G09F 3/02* (2006.01)
*G09F 3/14* (2006.01)

(52) U.S. Cl.
CPC ............ *G09F 3/02883* (2021.05); *G09F 3/14* (2013.01)

(58) Field of Classification Search
CPC ........... G09F 3/02883; G09F 3/02; G09F 3/14
USPC ....... 40/124.01, 200, 299.01, 359, 360, 584, 40/590, 607.01, 607.1, 628, 629, 642.02, 40/672; 281/2, 5, 12, 14, 51; 283/61, 283/62, 72, 74, 81, 98, 105, 106
See application file for complete search history.

(56) References Cited

U.S. PATENT DOCUMENTS 652,747 A 7/1900 Cole
3,977,104 A 8/1976 Stupar
4,077,145 A 3/1978 Smoczynski
5,042,181 A 8/1991 Fortsch
7,194,829 B2 3/2007 Boire et al.
7,748,150 B2 7/2010 Chuang
7,843,334 B2 11/2010 Kumagai et al.
8,171,660 B2 5/2012 Joynt
10,960,955 B2 3/2021 Howell-McLean et al.
2005/0183298 A1* 8/2005 Cohen ....................... G09F 3/16 40/308
2007/0151135 A1 7/2007 Lin
2009/0064547 A1* 3/2009 Condor ..................... G09F 1/06 40/124.14
2012/0090148 A1 4/2012 Brandon
2014/0007477 A1 1/2014 Berger et al.
2015/0074004 A1 3/2015 Song
2015/0151805 A1 6/2015 Nardi
2021/0170232 A1 6/2021 Kabbash et al.
2021/0225204 A1 7/2021 Hughes et al.

* cited by examiner

*Primary Examiner* — Justin V Lewis
(74) *Attorney, Agent, or Firm* — Dunlap Bennett & Ludwig, PLLC

(57) ABSTRACT

A low-profile labelling device for mounting to a cylindrical object, enabling identification of a rider participating in a cycling event by labeling the seat post with a racing number. The low-profile labelling device may thin enough so as to be folded from a flat condition to a folded condition that provides a saddle fitting interfacing an outer surface of the seat post and connected by way of a zip tie, facilitating an easy to use, affordable, secure fitting, and professional mount a racing number to identify a rider during a cycling event.

1 Claim, 4 Drawing Sheets

LABELER FOR CYLINDRICAL OBJECTS

BACKGROUND OF THE INVENTION

The present invention relates to labeling systems and, more particularly, to a labelling device for mounting to a cylindrical object, enabling identification of rider participating in a cycling event by labeling the seat post with a racing number.

When entering a cycling event each rider and their bike must be identifiable by a race number. The rider's number is easily joined to their jersey. For mounting to the bike, however, especially for those who want to mount the race number behind the seat post—say, because it looks more professional—a few challenges need to be overcome.

First, mounting the race number behind the seat post limits the connection point to one, as compared to attaching the racing number along the 'front triangle area' of the frame, which affords multiple connection points to at least two different frame members. Such front triangle area connections make frameless number plates feasible by way of inexpensive zip ties or twist ties connectors to the at least two different frame members.

Thus, merely using a zip tie or twist tie to connect a frameless number label behind the seat post results in too much shifting or movement of the frameless number label along the seat post, sometimes resulting in erratic flapping, making it difficult for officials to identify athletes during a crowded race.

As a result, these one-point connections in the prior art require a rigid plate or frame that is coupled to a rigid collar, herein the collar engages an outer circumference of the seat post, by way of fasteners. These plate/frame collared number labels are very expensive compared to the frameless number labels that may be paper-based or made of low-profile plastic that are connected to the front triangle area by way of inexpensive zip ties or twist ties.

As can be seen, there is a need for a low-profile labelling device for mounting to a cylindrical object, enabling identification of a rider participating in a cycling event by labeling the seat post with a racing number. The low-profile labelling device may thin enough so as to be folded from a flat condition to a folded condition that provides a saddle fitting interfacing an outer surface of the seat post and connected by way of a zip tie, facilitating an easy to use, affordable, secure fitting, and professional mount a racing number to identify a rider during a cycling event.

SUMMARY OF THE INVENTION

In one aspect of the present invention, a foldable label includes the following: an operative surface comprising a first side and a second side, wherein in a flat condition said sides have a reflection symmetry about a longitudinal axis of the operative surface; each side providing an indicium surface and a shoulder; a head tab interconnected to the shoulders by way of a tab fold line; two side fold lines extending from a rear point on the longitudinal axis to the tab fold line with the reflection symmetry in the flat condition; and the operative surface foldable about the tab fold line so that the head tab forms an arcuate saddle fitting.

In another aspect of the present invention, a foldable label for mounting to a cylindrical object, the foldable label providing a flat configuration including the following: a first side and a second side having a reflection symmetry about a longitudinal axis of the flat configuration; each side providing an indicium surface; and a head tab interconnected to the first and second sides by way of a tab fold line; and a folded configuration wherein the head tab defines an arcuate saddle fitting dimensioned and shaped to interface with an outer surface of the cylindrical object.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a low-profile labelling device for mounting to a cylindrical object, enabling identification of a rider participating in a cycling event by labeling the seat post with a racing number. The low-profile labelling device may thin enough to be folded from a flat condition to a folded condition that provides a saddle fitting interfacing an outer surface of the seat post and connected by way of a zip tie, facilitating an easy to use, affordable, secure fitting, and professional mount a racing number to identify a rider during a cycling event.

Figure 1:
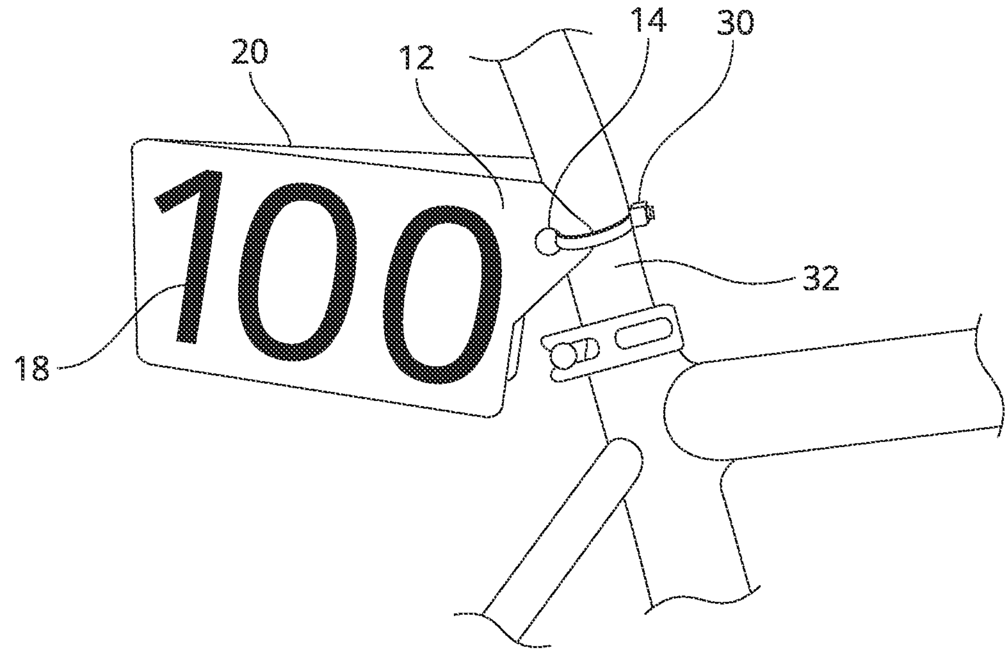
FIG. 1 is a perspective view of an exemplary embodiment of the present invention, shown in use.

Referring to FIGS. 1 through 4, the present invention may include a foldable label 10 for interfacing with and mounting to a cylindrical object, such as a post, pipe, conduit or the like. The foldable label 10 is moveable between a flat condition (FIG. 2) and a folded condition (FIG. 1). In the flat condition, along the operative surface the foldable label 10 has two sides 12, 20 that have reflection symmetry about a longitudinal axis 100. The foldable label 10 may be any substrate that is thin enough to be folded, such as paper or a plastic sheet with a thickness less than approximately eighteen millimeters (mm).

The first side 12 may have a rectangular indicium surface 17 providing a first indicium 18. The second side 20, having reflection symmetry, may have a second indicium 26 that is a mirror image, about the longitudinal axis 100, of the first indicium 18.

In other embodiments, there need not be a relationship between the first and second indicia 18, 26. It must also be understood that in many embodiments the first indicium surface 17 may not be rectangular, as other geometric and other non-geometric shapes may work as contemplated herein. With that said, the use of the word 'rectangular' may be used going forward only to facilitate understanding of the overall inventive concept.

The first side 12 may provide a shoulder 13 that protrudes forward from (at least a portion of) the front edge of the rectangular first indicium surface 17. The directional term 'forward' and related directional terms (such as, 'front', 'rearward', and 'sideward' or 'lateral') are to be understood in view of FIG. 2, wherein 'forward' is directed toward an upper margin thereof. The directional terms are not to be construed as inherently limiting, much like the term 'rectangular' is not to be construed as limiting the shape of the first indicium surface 17, but is rather provided herein to improve overall understanding to those skilled in the art.

As a result of the reflection symmetry, the second side 20 may also have a similar shoulder 23. Each shoulder 13, 23 provides a connection holes 14 and 22, respectively. Cradled between the first and second shoulders 13, 23 is a head tab 28, which is bisected by and thus mirror about the longitudinal axis 100. The head tab 30 protrudes forward and ends at a curved boundary 32. A tab fold line 30 may separate the head tab 28 from the shoulders 13, 23. The tab fold line 30 is curved and has a radius of curvature somewhere in the range of approximately 0.625 inches and approximately 0.635 inches.

Figure 2:
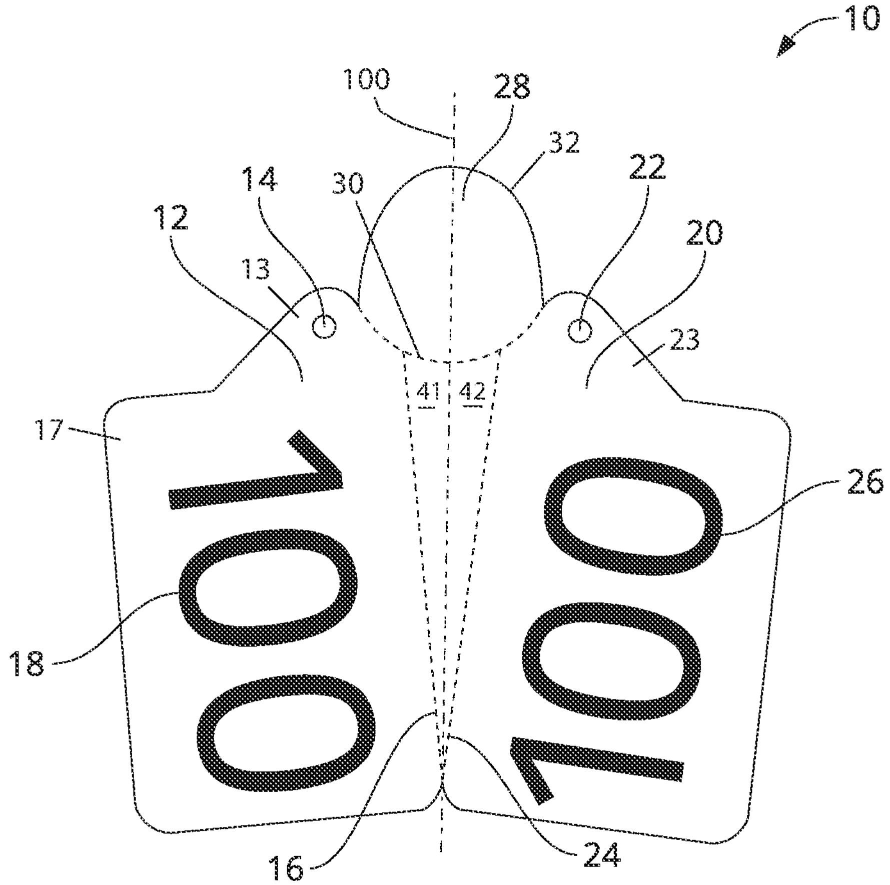
FIG. 2 is a front elevation view of an exemplary embodiment of the present invention.
Figure 3A:
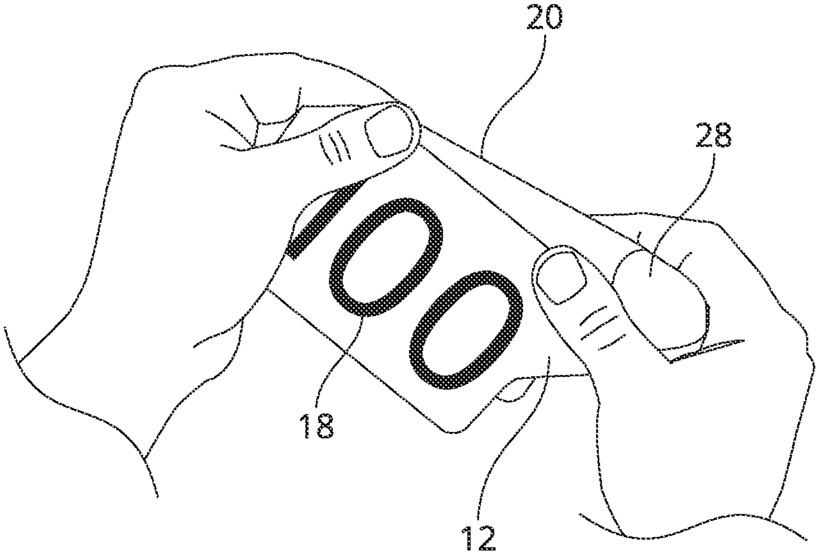
FIG. 3A is a perspective view of an exemplary embodiment of a first step of installation of the present invention.
Figure 3B:
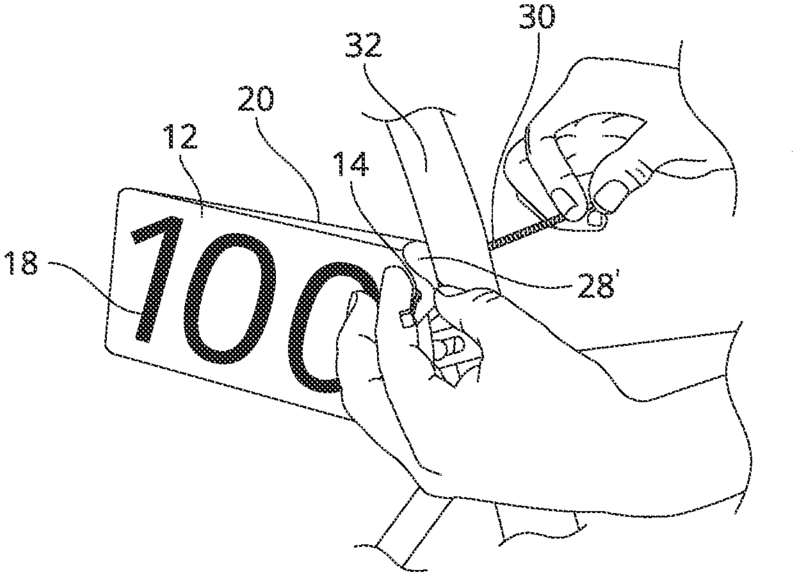
FIG. 3B is a perspective view of an exemplary embodiment of a second step of installation of the present invention.
Figure 3C:
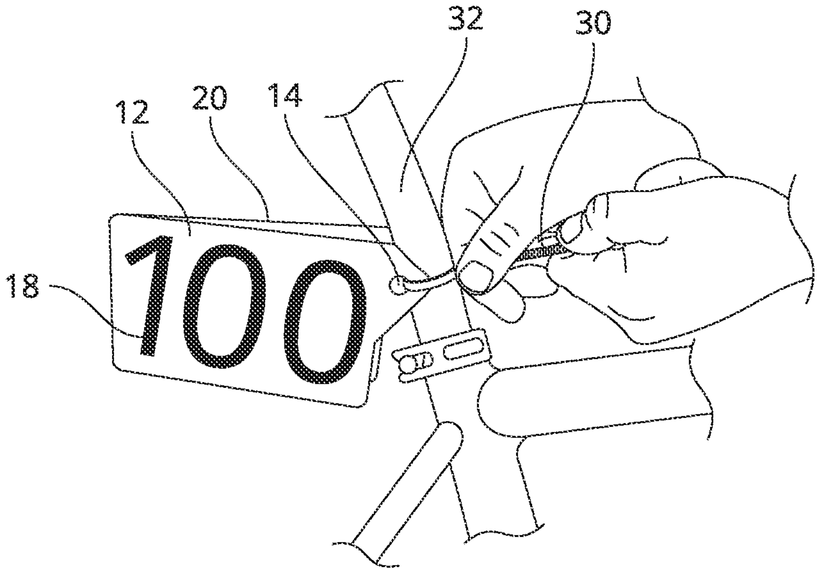
FIG. 3C is a perspective view of an exemplary embodiment of a third step of installation of the present invention.
Figure 3D:
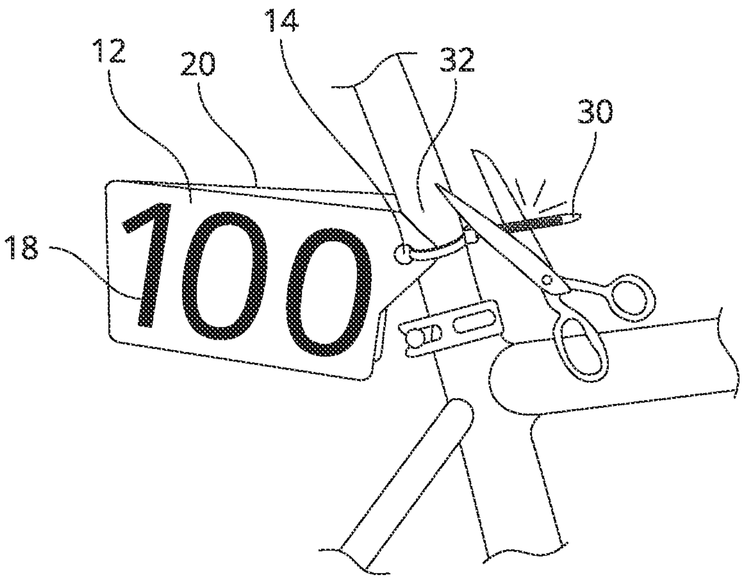
FIG. 3D is a perspective view of an exemplary embodiment of a fourth step of installation of the present invention.
Figure 4:
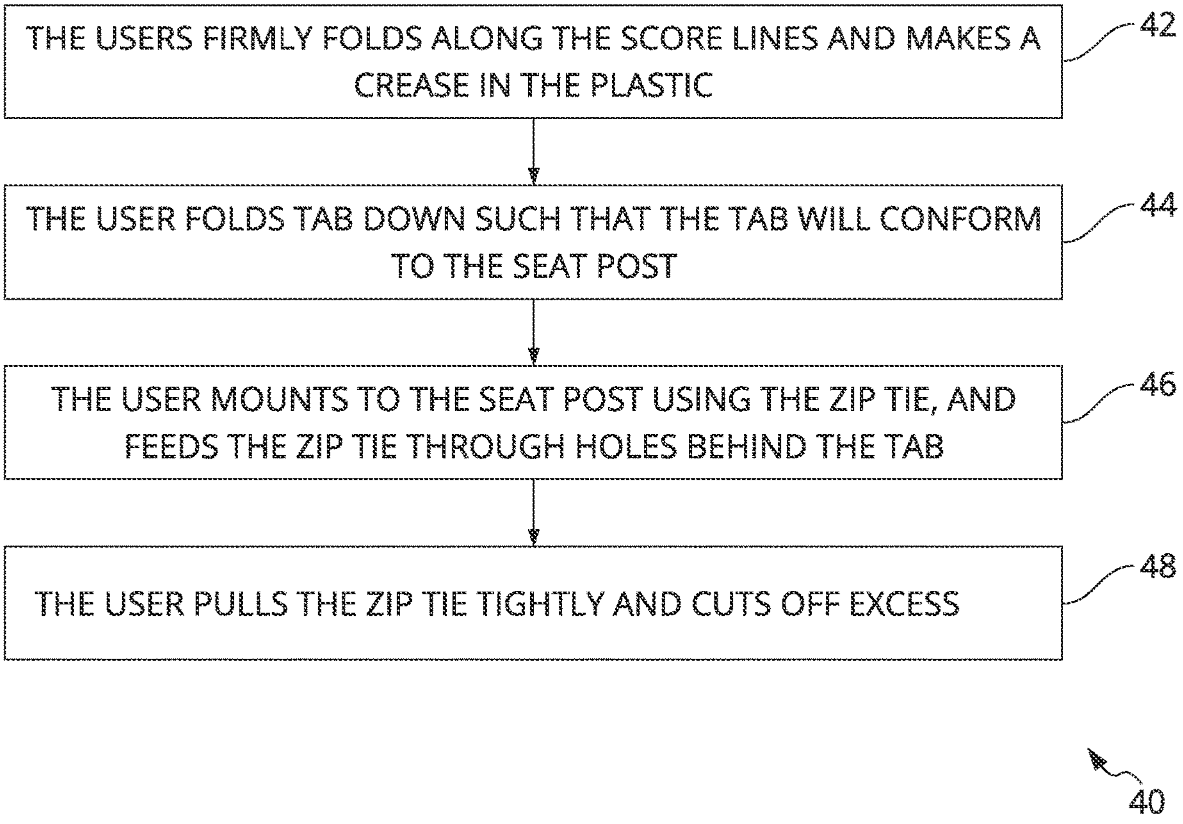
FIG. 4 is a flow chart of an exemplary embodiment of the present invention.

From a rear edge of the paper-based label 10, two fold lines 16, 24 symmetrically diverge from a shared point along the longitudinal axis 100 until they intersect the tab fold line 30 at points, respectively, that are substantially one-third inward of the respective end points of tab fold line 30. The first and second fold lines 16, 24 define a first and second throat sections 41, 42, respectively, of the paper-based label 10, as illustrated in FIG. 2.

When paper-based, the foldable substrate may include, but is not limited to, as suitable paper such as recycled or virgin liner, medium, fine paper, newspaper, chipboard, craft paper, paperboard, molded pulp, or any other cellulosic fiber-based substrate that is foldable along fold lines defined along the substrate.

The fold lines 16, 24, 30 may be scored by way of perforations, superficial recesses, or the like.

A method of using the present invention may include the following. The foldable label 10 disclosed above may be provided in the flat condition. A user may move the label 10 from the flat condition to the folded condition by firmly folding along the fold lines 16, 24, thereby making a crease along the longitudinal axis 100 between the first and second throat sections 41, 42 and bisecting the head tab 28. Pushing the first and second throat sections 41, 42 accordion-like between the two sides 12, 20, so that the first and second sides 12, 20 sandwich the throat sections 41, 42. Then the user may fold the head tab 28 along its tab fold line 30, thereby defining an arcuate saddle fitting 28' in the folded condition. Preferably the saddle fitting 28' has an inside diameter equal to or slightly smaller than the outside diameter of the cylindrical object 32 it is to interface with. For example, when the cylindrical object 32 has an outside diameter of 30 millimeters (mm) the saddle fitting 28' has an inside diameter slightly smaller than the 30 mm so that saddle fitting 28' resiliently fits around the cylindrical object 32.

With the saddle fitting 28' conformed to the outer circumference of the cylindrical object 32, say for instance a seat post, a filament connector 30 (such as a zip tie, twist tie, or the like) may be drawn through the connection holes 14 and 22 and wrapped around the cylindrical object 32. Then the user may engage the opposing ends of the filament connector 30 to securely engage the label 10 in the folded condition to the cylindrical object 32 by way of the interface of the saddle fitting 28' intrinsic to the label 10.

It should be noted that the Figures reference the indicia 18, 26 being a racing number, that any symbol or message may comprise the indicia 18, 26, as the systemic label 10 may be adapted to connect to any cylindrical object 32, not just the frame of a bike, for labeling or identifying an object associated with the cylindrical object 32.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of applying a race number behind a seat post of a bicycle, the method comprising:

providing a foldable label moveable between a flat condition and a folded condition, the foldable label comprising:

an operative surface having a longitudinal axis separating a first side and a second side so that in the flat condition said sides have a reflection symmetry about the longitudinal axis;

each side providing an indicium surface and a shoulder, the indicium surfaces each bearing a race number;

a head tab interconnected to the shoulders by way of a tab fold line;

for each side, a respective side fold line extending from a rear point on the longitudinal axis to the tab fold line;
the operative surface foldable about the tab fold line so that the head tab forms an arcuate saddle fitting; and
a connector hole disposed in each shoulder;
folding said foldable label to the folded condition;
interfacing the arcuate saddle fitting against a rear portion of the seat post; and
cinching the shoulders in the folded condition together by way of a filament connector that attaches to a front portion of the seat post.

* * * * *